May 18, 1954     H. OTTO     2,678,711
DISPENSING CHUTE FOR COMBINES
Filed Dec. 7, 1950     2 Sheets-Sheet 1
Fig.1
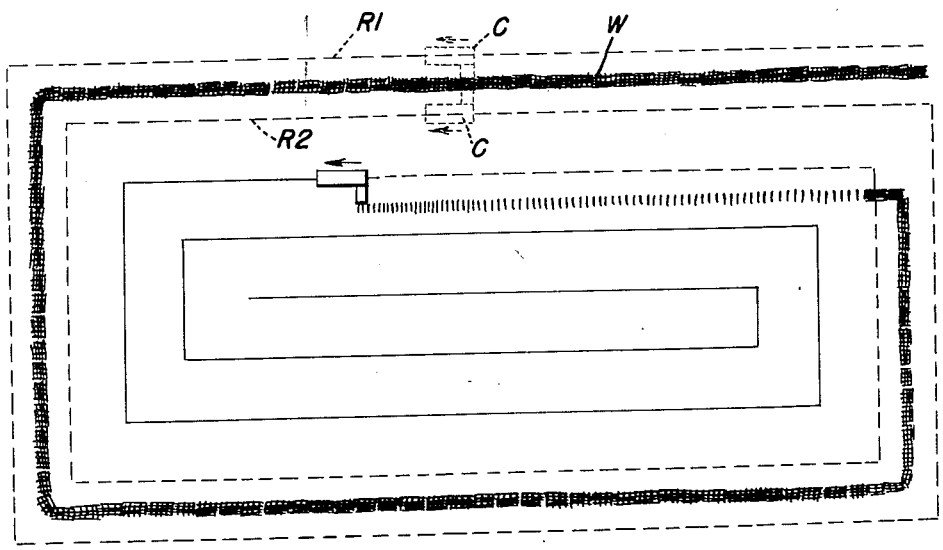
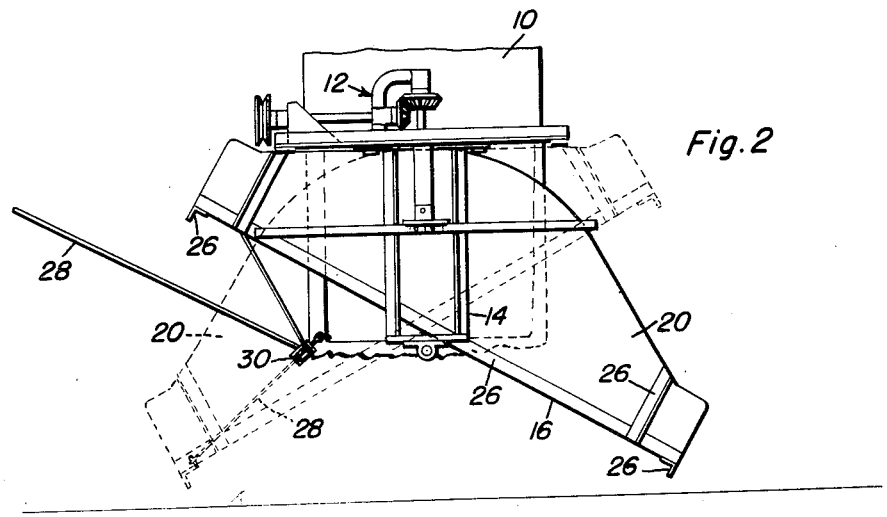
Fig.2
Fig.5
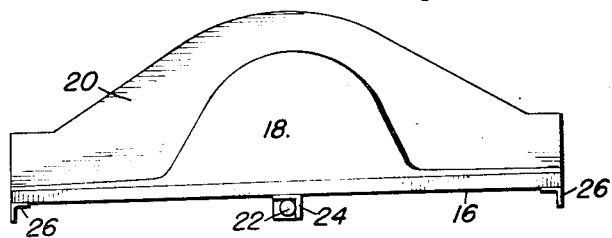
Herbert Otto
INVENTOR.

Herbert Otto
INVENTOR.

Patented May 18, 1954

2,678,711

UNITED STATES PATENT OFFICE 2,678,711

DISPENSING CHUTE FOR COMBINES

Herbert Otto, Alta, Iowa

Application December 7, 1950, Serial No. 199,674

1 Claim. (Cl. 193—17)

This invention relates to new and useful improvements in combines and the primary object of the present invention is to provide a vertically rockable delivery chute for combines whereby material may be discharged from a selected side of a combine.

Another important object of the present invention is to provide a delivery chute for combines that is so constructed and mounted as to reduce the number of rows formed by material discharged from a combine as the combine is moved back and forth over a field.

A further object of the present invention is to provide a dispensing chute of the aforementioned character that is quickly and readily applied to or removed from a combine without in any way harmfully affecting the structure or operation of a combine.

A still further aim of the present invention is to provide a dispensing chute for combines that is simple and practical in construction, strong and reliable in use, small and compact in structure, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the manner in which rows of crops are disposed by the present chute;

Figure 2 is a rear elevational view of the present invention mounted on the rear of a combine and with the dotted lines showing an alternate position for the chute;

Figure 3:
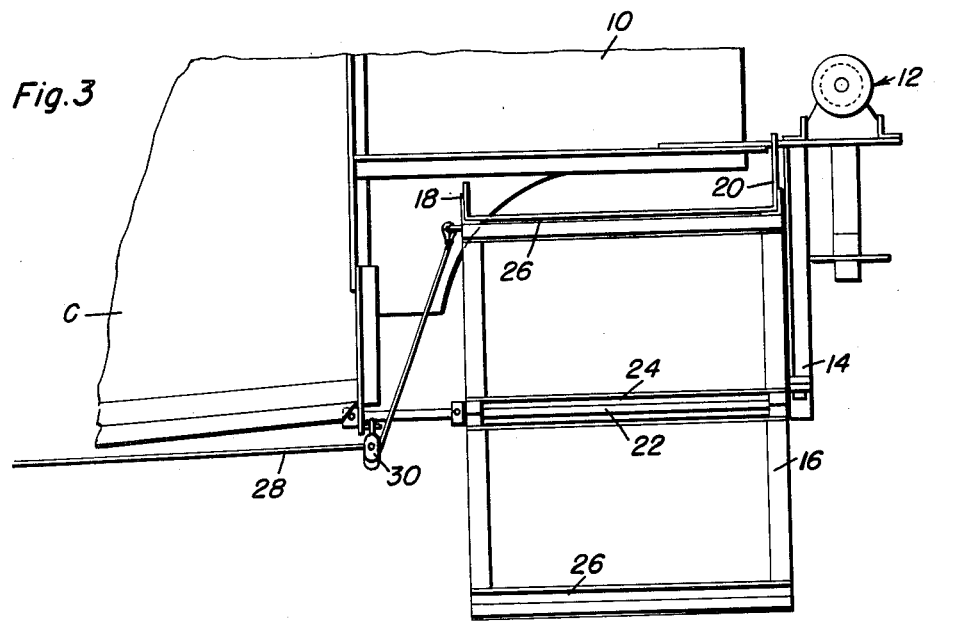
Figure 3 is a side elevational view of Figure 2.

Referring now to the drawings in detail, wherein for the purpose of illustration, there is disclosed a preferred embodiment of the present invention, the numeral 10 represents the rear discharge portion of a combine having the usual drive means 12 for a spreader (not shown), the spreader supporting frame 14 and the riddle R.

The present invention comprises an elongated chute or flat panel 16 that replaces the spreader. Forward and rear side walls 18 and 20 rise from the panel 16 and the side wall 18 is considerably smaller than the side wall 20 so that the device may fit beneath the rear portion of a combine for rocking movement and air pressure may enter the ends of the chute from the front thereof to loosen up material in said ends and facilitate discharge of the material.

A horizontal shaft 22 is supported by the frame 14 at the rear of the combine. The shaft 22 is disposed longitudinally of the combine beneath the portion 10 and rotatably supports an angle iron member 24 that is disposed transversely of and medially the ends of the panel 16. The angle iron member 24 is suitably fixed to the panel 16 and coacts with additional angle iron members 26 which are also fixed to the panel 16 in reinforcing and strengthening the panel 16.

A flexible operator or element 28 extends rearwardly from the forward end of the combine, over a pulley 30 that is swiveled to the portion 10, and is suitably secured to the panel 16 or to one end of the side wall 18.

Figure 4:
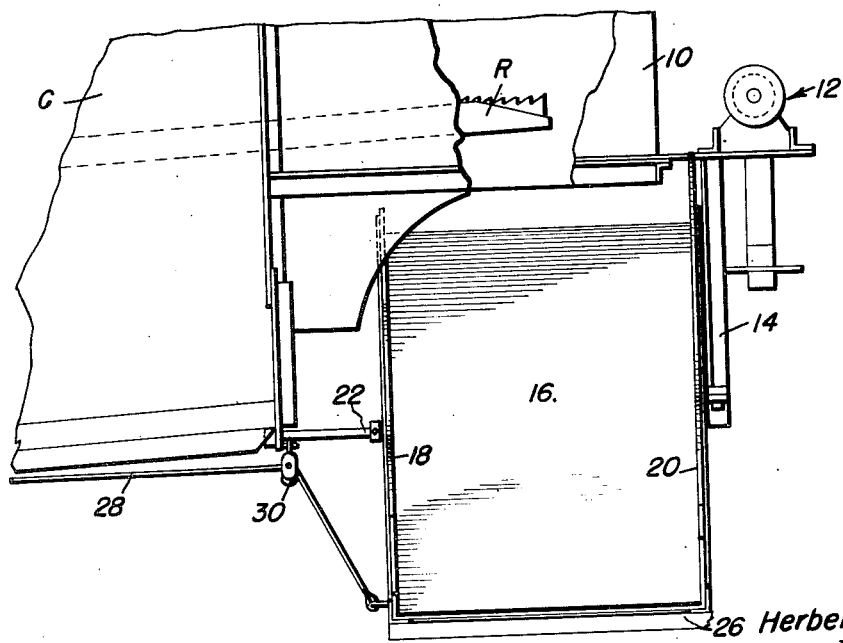
Figure 4 is a view similar to Figure 3 but showing the chute reversed to permit discharge of material on the opposite side of the combine from that shown in Figure 3 and with parts of the combine broken away; and, Figure 5 is a side elevational view of the present invention removed from the combine.

In practical use of the present invention, as the cable 28 is manually pulled, one end of the panel 16 will be raised and its other end lowered as shown in Figures 2 and 3. As tension on the cable 28 is released, the raised end of the panel will be lowered and its lowered end will be raised as shown in Figure 4 and by dotted lines in Figure 2.

Since the chute may be retained inclined downwardly from a selected side of the combine, the procedure shown in Figure 1 is possible. As the combine C makes its first run R1 material is stacked along one side of the combine, then the chute is tilted so that as the combine makes its second run R2 the material will be stacked upon the material discharged during the first run, resulting in a double windrow W and, thereby reducing the time, machinery and labor required for assembling the windrows.

Having described the invention, what is claimed as new is:

A chute comprising an elongated rectangular panel, an angle iron member fixed transversely to the bottom of the panel midway between the ends of the panel and adapted to rockably straddle a horizontal longitudinal shaft of a combine to support said panel for vertical rocking in opposite directions to discharge material out of the combine from opposite ends of the panel, side walls rising from opposite sides of the panel, the side wall at one side of the panel being smaller than the other side wall to permit air to blow over the panel at its ends from said side and crosswise of the panel to loosen up and facilitate discharge of material from said ends.

References Cited in the file of this patent

UNITED STATES PATENTS

| Number | Name | Date |
|---|---|---|
| 635,499 | Melius | Oct. 24, 1899 |
| 667,061 | Clarkson | Jan. 29, 1901 |
| 838,663 | Stephens | Dec. 18, 1906 |
| 1,946,656 | Lindgren et al. | Feb. 13, 1934 |
| 2,266,567 | Raney | Dec. 16, 1941 |

FOREIGN PATENTS

| Number | Country | Date |
|---|---|---|
| 12,939 | Great Britain | June 6, 1902 |